United States Patent [19]
Leonard

[11] Patent Number: 5,878,929
[45] Date of Patent: Mar. 9, 1999

[54] DEVICE FOR CARRYING A GUN OR BOW ON AN ATV

[76] Inventor: Barry D. Leonard, 116 Lincoln St., Lexington, N.C. 27295

[21] Appl. No.: 974,719

[22] Filed: Nov. 19, 1997

[51] Int. Cl.⁶ .................. B60R 9/00; B60R 9/08
[52] U.S. Cl. ............... 224/401; 224/546; 224/558; 224/567; 224/570; 224/913; 211/64
[58] Field of Search .................... 224/401, 913, 224/412, 428, 429, 430, 441, 442, 443, 446, 448, 456, 461, 319, 545, 546, 547, 552, 555, 558, 566, 567, 570; 206/317; 211/64

[56] References Cited

U.S. PATENT DOCUMENTS

| | | | |
|---|---|---|---|
| 2,807,398 | 9/1957 | Mathews | 224/546 X |
| 3,142,424 | 7/1964 | Reed, Jr. | 224/913 X |
| 3,767,093 | 10/1973 | Pinkerton et al. | |
| 3,806,010 | 4/1974 | Utigard | 224/913 X |
| 3,857,491 | 12/1974 | Townsend et al. | |
| 4,396,135 | 8/1983 | Lundgren | 224/461 |
| 4,674,782 | 6/1987 | Helber | 224/401 X |
| 4,811,874 | 3/1989 | Robison | 224/547 X |
| 4,915,273 | 4/1990 | Allen | |
| 5,344,032 | 9/1994 | Ramsdell | |
| 5,476,188 | 12/1995 | Hassenpflug | |
| 5,595,333 | 1/1997 | Boston | |
| 5,655,695 | 8/1997 | Anderson et al. | 224/431 |
| 5,706,990 | 1/1998 | Lahrson | 224/913 X |

FOREIGN PATENT DOCUMENTS 2170994  8/1986  United Kingdom .

*Primary Examiner*—Allan N. Shoap
*Assistant Examiner*—Gregory M. Vidovich
*Attorney, Agent, or Firm*—Richard C. Litman

[57] ABSTRACT

A device for mounting to the rear rack of an ATV for holding a gun or bow for transport includes a horizontal anchoring member attached the device to the rear rack of an ATV by U-bolts. A corner brace is welded to one end of the anchoring member. The corner brace is provided with a pair of threaded mounting pins which are used to hold a scabbard-type gun boot or a bow adapter for holding a bow. The scabbard or bow is held in place, when mounted on the pins, by threading and tightening a mounting knob on each pin. A bow adapter is made up of a main support member mounted on the mounting pins and secured by the mounting knobs. The support member is provided with a U-shaped bracket and a C-shaped bracket for frictionally holding a bow. A dual mount adapter may be used to mount an additional gun boot or bow adapter. This dual mount adapter includes a mounting plate engaging the mounting pins and secured along with a first scabbard or bow adapter by the mounting knobs. A horizontal bridge member connects the mounting plate to a second corner brace, identical to the first with mounting pins and knobs for mounting the second scabbard or bow adapter.

7 Claims, 3 Drawing Sheets

DEVICE FOR CARRYING A GUN OR BOW ON AN ATV

BACKGROUND OF THE INVENTION

1. Field of the Invention

The present invention relates to gun racks. More specifically, this invention relates to a device for carrying a gun or a bow on the rear rack of an all terrain vehicle (ATV).

2. Description of the Related Art

Hunters and sportsman often look for secluded locations from which to stalk their prey. This often involves a short journey. To ease the trip there and back, hopefully with game from the day's efforts, a vehicle is used. However, because of the terrain and close quarters, small all terrain vehicles (ATVs) are commonly used instead of full sized trucks. The trade off for this maneuverability is storage space. A typical ATV has a rear storage rack, and nothing more. The hunter is left to hold his gun or bow on his lap, or otherwise tie it to the rear rack of the ATV. This leads to the dangerous situation of having the gun point horizontally, where in the event of accidental discharge grave consequences could result.

To avoid these consequences, it is necessary to point the barrel of the gun toward the ground, as any young sportsman is taught. This however is difficult when trying to steer an ATV through fallen branches, rocks, and streams. It is therefore necessary to have a device that will hold a gun in a safe position while simultaneously freeing the hunter to drive the ATV. The problems multiply if the hunter is carrying two guns, making it nearly impossibly to hold the two through the bumps and turns. A solution for this problem is also needed, as well as to address concerns of carrying bows during appropriate hunting seasons.

Apparatus for carrying a bow or long gun on vehicles have been the subject of previous patents. U.S. Pat. No. 5,595,333, which issued to Boston on Jan. 21, 1997, discloses a rack for carrying a bow or long gun on an all-terrain vehicle. A clamping arrangement engages the limbs of the bow and cradles for holding a gun. The apparatus also has support arms for holding and supporting a hunting seat or tree stand.

U.S. Pat. No. 4,915,273, which issued to Allen on Apr. 10, 1990, discloses a bow and gun holder for off-road vehicles. A pair of brackets for attaching to the handle bars of an ATV or motorcycle include a spring biased clamp for accommodating a bow or gun.

Other devices for mounting long guns to vehicles include U-shaped brackets for holding the barrel end of the gun and a locking device supporting the butt or stock of the gun. Examples of these devices include U.S. Pat. No. 3,857,491 (vehicle mounted gun rack) which issued to Townsend et al. on Dec. 31, 1974; U.S. Pat. No. 5,334,032 (gun holder for vehicles) which issued to Ramsdell on Sep. 6, 1994; and U.S. Pat. No. 3,767,093 (manually operated vehicle mounted gun lock) which issued to Pinkerton et al. on Oct. 23, 1973.

Other devices designed to make guns easier and safer to use have also been the subject of earlier patents, but are less related to the present invention. These include U.S. Pat. No. 5,476,188 (gun boot) which issued to Hassenpflug on Dec. 19, 1995 and UK Patent document 2,17,994 A (gun security system) published Aug. 20,1986.

Despite previous efforts, there is still a need for a simple, inexpensive, compact device capable of mounting a bow or a gun in a safe position on an ATV.

None of the above inventions and patents, taken either singularly or in combination, is seen to describe the instant invention as claimed. Thus a gun boot bracket solving the aforementioned problems is desired.

SUMMARY OF THE INVENTION

The present invention is a device for mounting to the rear rack of an ATV for holding a gun or bow for transport. A horizontal anchoring member attaches the device to the rear rack of an ATV by U-bolts. A corner brace is welded to one end of the anchoring member. The corner brace is provided with a pair of threaded mounting pins which are used to hold a scabbard-type gun boot or a bow adapter for holding a bow. The scabbard or bow is held in place, when mounted on the pins, by threading and tightening a mounting knob on each pin.

A bow adapter may be used when appropriate. Such an adapter is made up of a main support member provided with mounting holes, for engaging the mounting pins. The adapter is secured to the device with the mounting knobs. The upper end of the support member forms a right angle and terminates with a U-shaped bracket, while the lower end forms a right angle terminating in a C-shaped bracket. Both brackets form a right angle and extend in a direction opposite the ground. The lower C-shaped bracket is designed to hold the lower limb of a bow while the U-shaped bracket secures the upper limb from horizontal movement.

An additional scabbard or bow adapter may be mounted to the device by using a dual mount adapter. This dual mount adapter comprises a mounting plate having mounting holes for engaging the mounting pins. A first scabbard or bow adapter is mounted on the mounting pins of the device, whereupon the mounting plate of the dual mount adapter is mounted thereon to serve as a second gun or bow mount. Finally, a pair of mounting knobs secures both the scabbard and the dual mount adapter in place. A horizontal bridge member connects the mounting plate to a second corner brace, identical to the first. Likewise, mounting pins and knobs are in the second corner brace.

In this manner, one or two scabbards, one or two bows, or one of each may be mounted to an ATV. Mounting the guns in this way insures a safe carrying position, with barrels pointing towards the ground. Furthermore, mounting either guns or bows this way frees the hands of the ATV driver to steer the vehicle.

Accordingly, it is a principal object of the invention to mount a gun boot to an ATV for transporting a long gun.

It is another object of the invention to position the gun safely in case of accidental misfire.

It is a further object of the invention to free the hunter to use both hands while operating the ATV.

Still another object of the invention is to mount a bow to an ATV for transport.

Yet another object of the invention is to mount a second gun or bow safely to the ATV.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
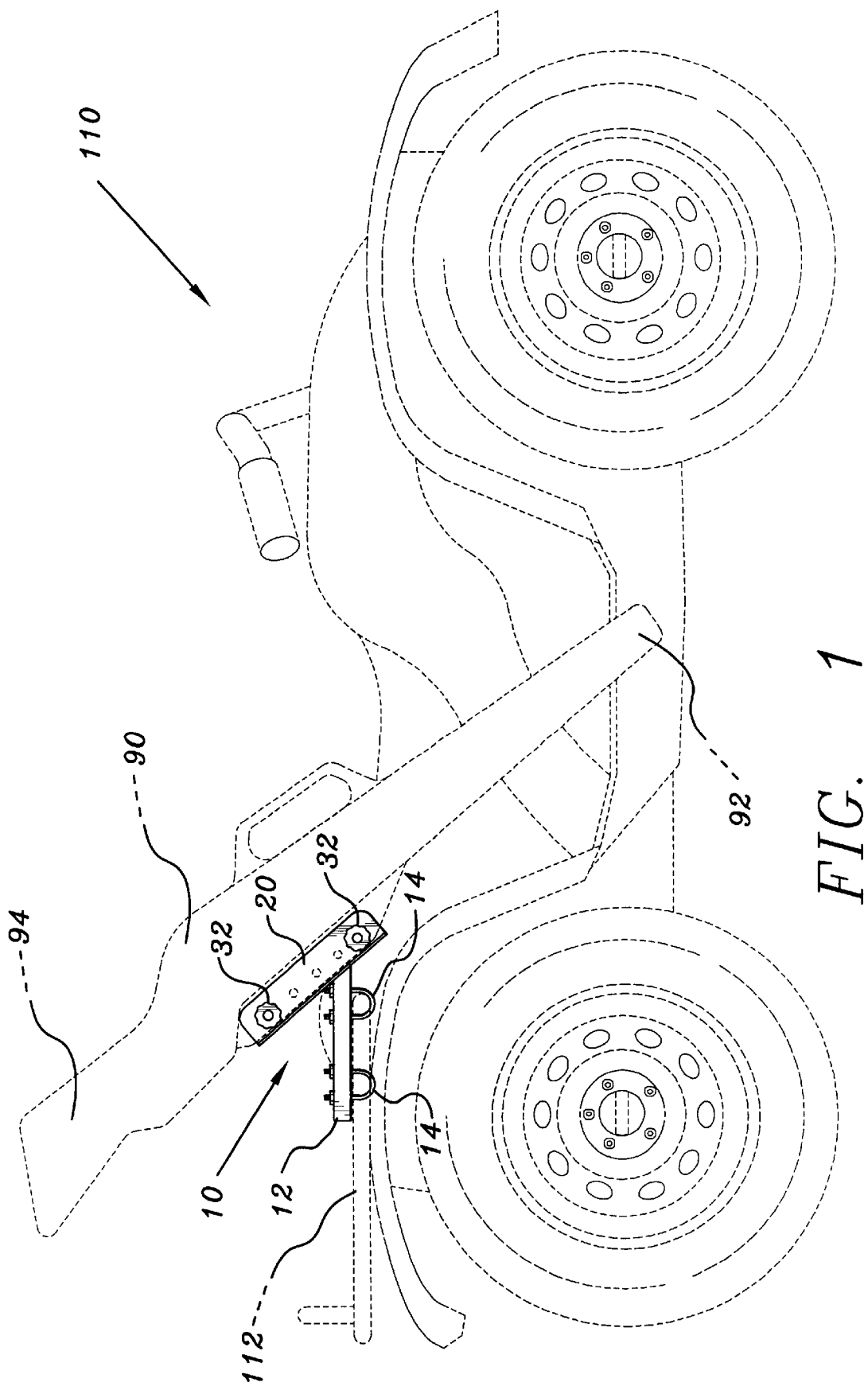
FIG. 1 is an environmental, side view of a gun boot bracket according to the present invention, mounted on the rack of an ATV.

Referring now to the figures by numerals of reference, the device 10 for mounting a scabbard-type gun boot 90 and an adapter 40 for mounting a bow 100 are shown. In background to appreciation of the present invention, the scabbard-type gun boot 90 is known to be commercially available, and generally constructed of hard plastic material. The scabbard 90 has a barrel end 92 and a butt end 94, with a plurality of mounting holes located approximately midway between the two ends. The butt end 94 of the scabbard 90 is removable to allow access to the gun held within and is used in much the same way as a sword and scabbard.

As seen in FIG. 1, the present invention is a device 10 mounted to the rear rack 112 of an ATV 110 preferably by a pair of U-bolts 14. A scabbard-type gun boot 90 is mounted to the device 10 so that the barrel of a gun contained inside the scabbard 90 points safely toward the ground. Placement of the device 10 in such a position leaves a majority of the rear rack 112 free for other storage and does not interfere with the seating position of the driver. The device 10 includes a horizontal anchoring member 12 having apertures through which the U-bolts 14 pass in attaching the device 10 to the rear rack 112, a corner brace 20, a pair of mounting pins 30, and a pair of mounting knobs 32.

The horizontal anchoring member 12, preferably constructed of squared steel tubing, is used to attach the entire device 10 to the rear rack 112 of an ATV 110. The leg portions of each of a pair of U-bolts 14 pass on either side of a portion of the rear rack 112 and are secured by matingly threaded nuts after passing though the horizontal anchoring member 12. In this manner, the device 10 may be removably secured to the ATV 110. The device 10 is preferably attached such that the scabbard 90 when secured will have its barrel end 92 pointing toward the ground in between the front and rear tires of the ATV 110.

The corner brace 20, preferably of steel, depends upwardly from one end of the anchoring member 12. The corner brace 20 has an upper end 22, a lower end 24, a first planar member 26, and a second planar member 28 which forms a right angle with the first planar member 26. The corner brace 20 is preferably welded, at the lower end 24 of its first planar member 26, to one end of the horizontal anchoring member 12. The brace 20 forms a predetermined acute angle with the anchoring member 12, the angle chosen so that the attached scabbard 90 eventually points toward the ground without interfering with operation of the ATV.

A pair of threaded mounting pins 30 are affixed permanently to the second planar member 28. The mounting pins 30 are positioned so that they extend perpendicularly away from the second planar member 28 and parallel to the first planar member 26. Separated by a distance equal to the distance between mounting holes located on the scabbard 90, the pins 30 align in registry with and pass through these mounting holes. A pair of internally threaded mounting knobs 32 are threaded onto the mounting pins 30, tightening to hold the scabbard 90 in place on each pin 30.

In this manner, a scabbard-type gun boot 90 is mounted on the device 10 which is in turn mounted to the rear rack 112 of an ATV 110. A gun held in the scabbard 90 may be removed from the scabbard, without removing the scabbard from the device 10 or the ATV 110. A simple turn of two knobs 32 tightens or releases the scabbard 90 at the beginning or end of an outing.

Figure 3:
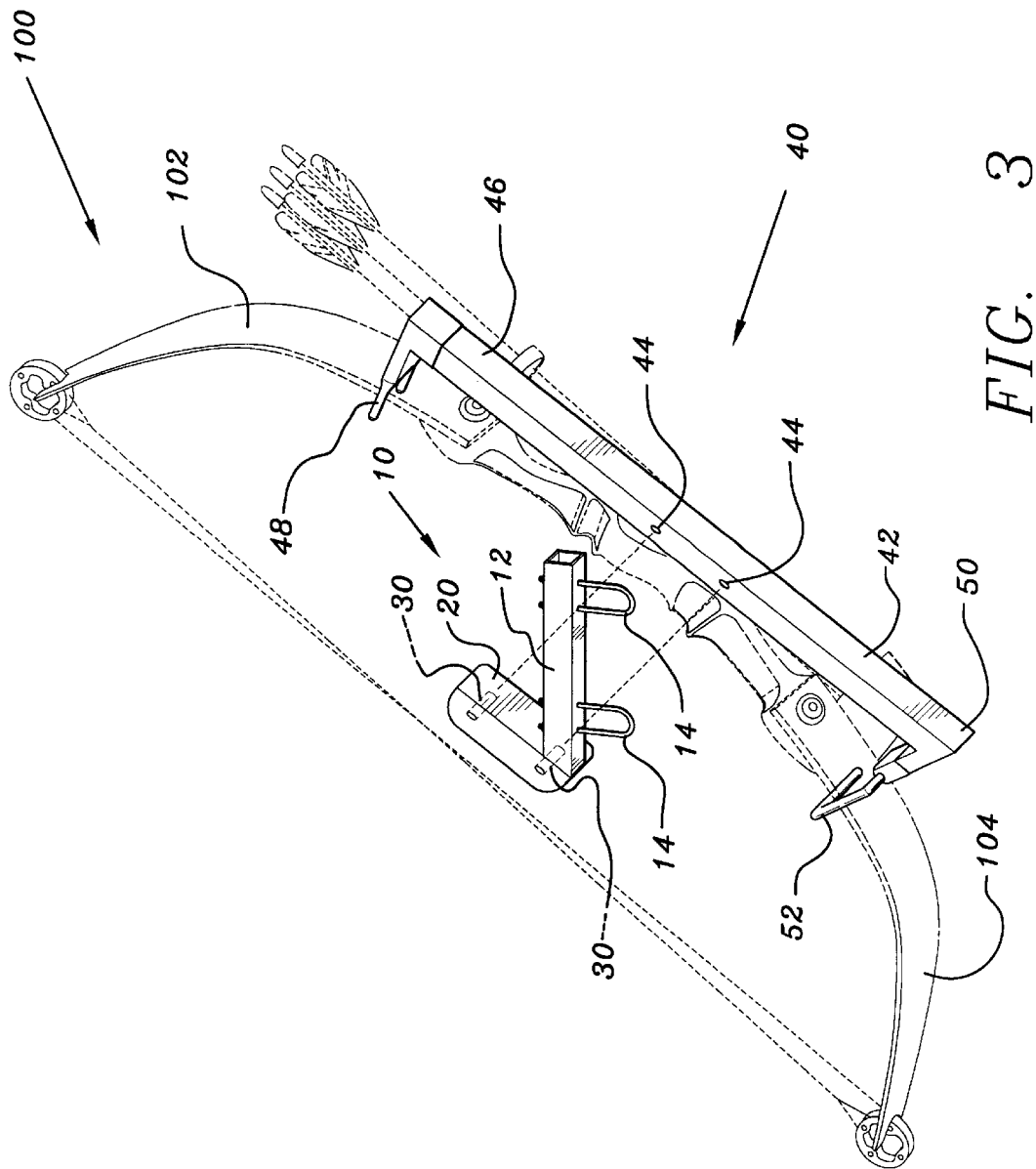
FIG. 3 is a perspective, exploded view of the gun boot bracket and the bow and arrow bracket attachment.

Because avid sportsmen often participate in different hunting seasons, many will need an adapter 40 to allow a bow 100 to be carried rather than a gun. A bow adapter 40 is shown in FIG. 3. The bow adapter 40 is made up of an elongated support 42 defining a pair of mounting holes 42 for coupling with the mounting pins 30 of the corner brace 20. The bow adapter 40 is secured by the mounting knobs 32 in replacement of the gun scabbard 90. The elongated support 42 has an upper end 46 forming a U-shaped bracket 48, extending at a right angle to the elongated support 42 in a direction opposite the corner brace 20. A lower end 50 of the support 42 forms a C-shaped bracket 52, also at a right angle to the elongated support 42 and parallel to the U-shaped bracket 48. To hold a bow 100 in place, the lower limb 104 of the bow is seated in the C-shaped bracket 52 where it is held against vertical movement by mechanical action and friction. The upper limb 102 of the bow 100 is placed in the U-shaped bracket 48 so that the bow may not shift horizontally. The brackets 48, 52 may be dip coated to protect the bow and for additional frictional support.

Figure 2:
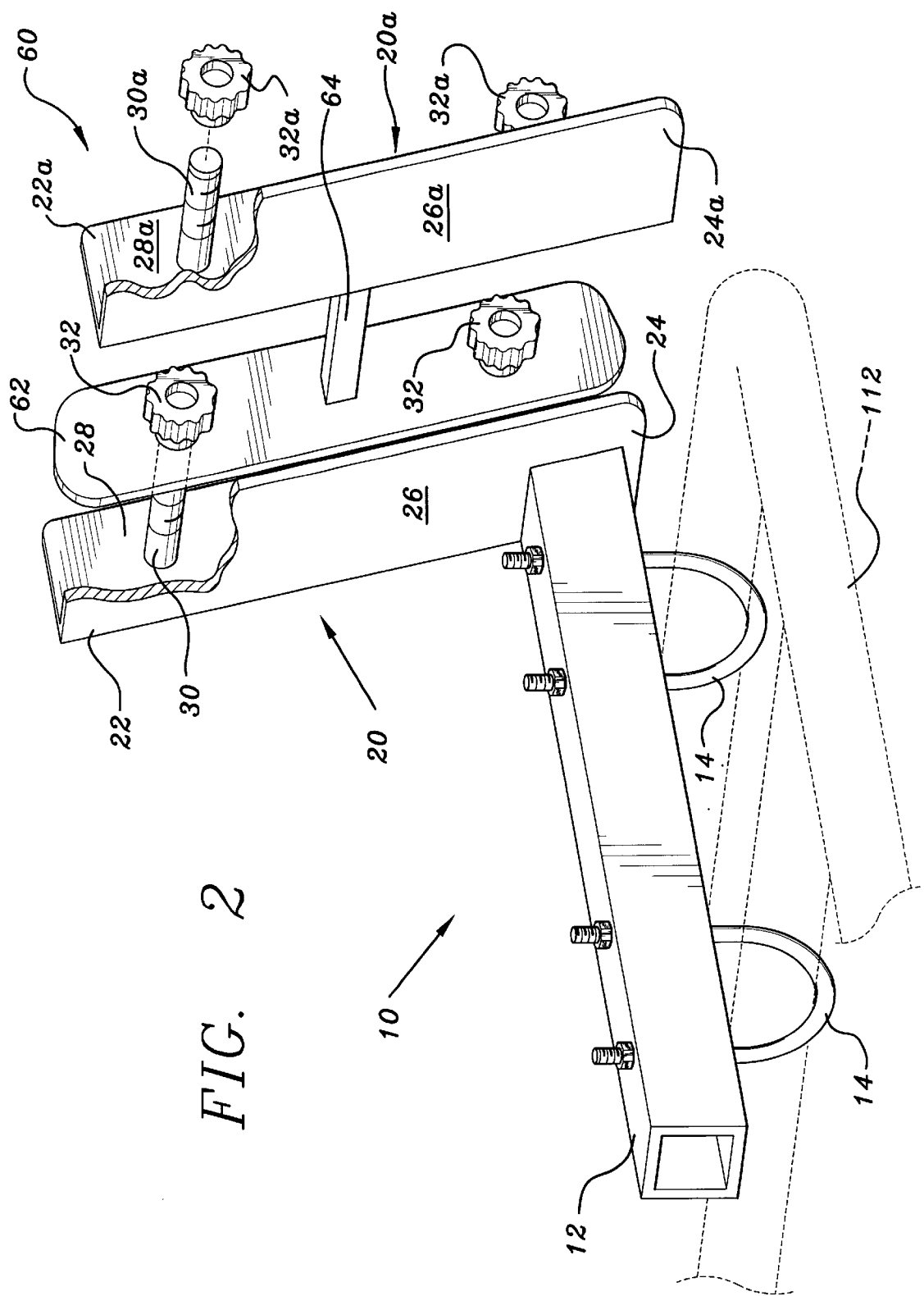
FIG. 2 is an environmental, perspective, cutaway, exploded view of the present invention, including the second gun boot bracket attachment.

Occasionally, the sportsman may desire bringing two guns, two bows, or one of each. For this reason, a dual mount adapter 60 for allowing the mounting of an additional gun scabbard 90 or bow adapter 40 is needed. Such a dual mount adapter 60 is shown in FIG. 2. The dual mount adapter 60 includes a substantially rectangular mounting plate 62, a second corner brace 20a similar in function to that of the basic device 10 with corresponding pins 30a and knobs 32a, and a horizontal bridge member 64 connecting the second corner brace 20a to the mounting plate 62. The rectangular mounting plate 62 defines two mounting holes through which the pins 30 from the first corner brace 20 pass, ultimately being secured by the threaded knobs 32. In this manner, a first gun scabbard 90 or bow adapter 40 then the dual mount adapter 60 may be mounted to the first set of mounting pins 30 and secured by the first set of mounting knobs 32. A second scabbard or bow adapter may be mounted on the dual mount adapter 60 by the pins 30a of the second corner brace 20a and secured there by a second set of knobs 32a.

By using this device 10, a sportsman may carry either a single gun with a single scabbard, a single bow when using a bow adapter, or two guns with scabbards, two bows with two bow adapters, or one of each when using a bow adapter. In any combination, the guns are kept pointing safely towards the ground while freeing the driver's hands for maneuvering the ATV through rugged terrain. Rear rack space is conserved by the side saddle design.

It is to be understood that the present invention is not limited to the embodiments described above, but encompasses any and all embodiments within the scope of the following claims.

I claim:

1. A device for mounting a scabbard gun boot, having a barrel end and a butt end with mounting holes midway therebetween, to a rear rack of an ATV, said device comprising:

a horizontal anchoring member;

an angled corner brace, having an upper end, a lower end, a first planar member to which said horizontal anchoring member is welded at said lower end, and a second planar member which forms a right angle with said first planar member;

a pair of threaded mounting pins depending from said second planar member and positioned such that said pins are displaced by a distance corresponding to the distance between mounting holes on the scabbard gun boot;

a pair of internally threaded knobs for securing the scabbard gun boot by respectively mating with said threaded mounting pins; and means for securing said horizontal anchoring member to the rack of the ATV.

2. The device as defined in claim 1 wherein said means for securing said horizontal anchoring member to the rack of the ATV includes a pair of U-bolts passing through and secured to said horizontal anchoring member.

3. The device as defined in claim 1, further including a bow adapter used for holding a bow, said bow adapter comprising:

an elongated support, having an upper end and a lower end, said support defining a pair of mounting holes for passage of said mounting pins of said corner brace, for securing said bow adapter to said corner brace by tightening said knobs;

said upper end forming a U-shaped bracket, at a right angle to said elongated support extending in a direction opposite said corner brace, for receiving and holding an upper limb of a bow; and said lower end forming a C-shaped bracket, at a right angle to said elongated support and parallel to said U-shaped bracket extending in a direction opposite said corner brace, for receiving and frictionally holding a lower limb of a bow.

4. The device as defined in claim 3 wherein said U-shaped bracket and said C-shaped bracket of said bow adapter are dip coated for protecting the bow held.

5. The device as defined in claim 1 further comprising a dual mount adapter comprising:

a rectangular planar mounting plate defining two mounting holes aligned for allowing said mounting pins to pass therethrough;

a second corner brace having a first planar member and a second planar member which forms a right angle with said first planar member and is parallel to said angled corner brace;

a pair of threaded mounting pins affixed permanently and perpendicularly to said second planar member of said second brace such that said pins are parallel to said first planar member of said second brace and that said pins are displaced by a distance corresponding to the distance between mounting holes on the scabbard gun boot;

a pair of internally threaded knobs for securing the scabbard gun boot by mating with said threaded mounting pins of said second brace; and a horizontal bridge member connecting said mounting plate to said second corner brace;

whereby a second scabbard gun boot may be mounted through use of the dual mount adapter.

6. The device as defined in claim 5, further including a bow adapter used for holding a bow, said bow adapter comprising:

an elongated support, having an upper end and a lower end, said support defining a pair of mounting holes for passage of said mounting pins of said one of first and second corner braces, for securing said bow adapter to said one corner brace by tightening said knobs;

said upper end forming a U-shaped bracket, at a right angle to said elongated support extending in a direction opposite said one corner brace, for receiving and holding an upper limb of a bow; and said lower end forming a C-shaped bracket, at a right angle to said elongated support and parallel to said U-shaped bracket extending in a direction opposite said one corner brace, for receiving and frictionally holding a lower limb of a bow.

7. The device as defined in claim 6 further comprising a second bow adapter, whereby a pair of bows can be mounted to said device.

* * * * *